3,232,784
PROCESS FOR COATING REGENERATED CELLU-
LOSE AND THE RESULTING PRODUCT
Markus Seibel, Mainz (Rhine), and Karl-Heinz Jung,
  Wiesbaden-Biebrich, Germany, assignors to Kalle Akti-
  engesellschaft, Wiesbaden-Biebrich, Germany, a cor-
  poration of Germany
  Filed May 18, 1962, Ser. No. 196,008
Claims priority, application Germany, May 20, 1961,
  K 43,784
6 Claims. (Cl. 117—76)

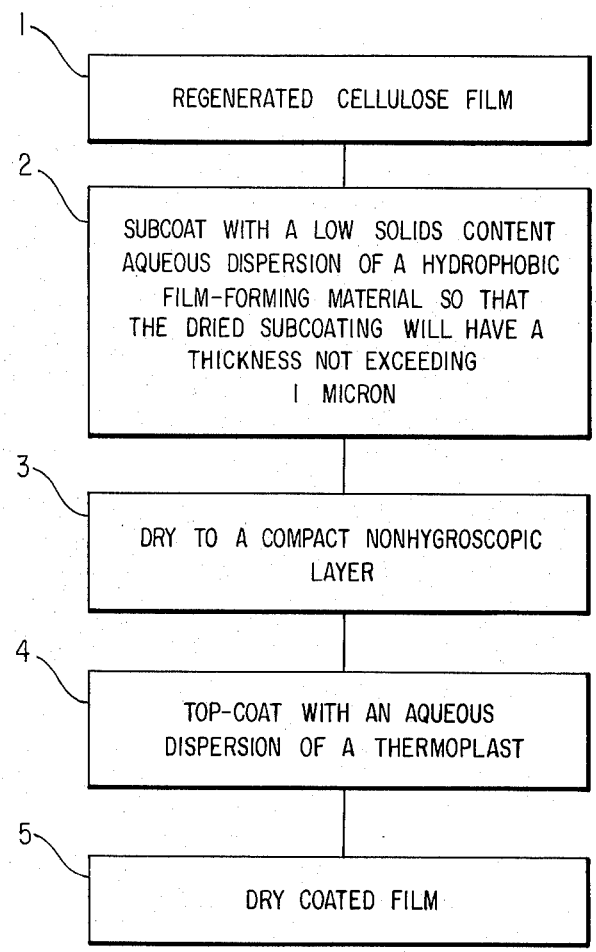

This invention is concerned with new products in sheet form based on regenerated cellulose and a process for their manufacture.

It is known to provide sheets of various kinds with a layer of synthetic plastic by applying a solution or a dispersion of plastic material and drying the coat applied. As a plastics dispersion there is often used an aqueous dispersion of a copolymer of vinylidene chloride with another copolymerisable substance, such as an acrylate or acrylonitrile, because these vinylidene chloride copolymers are good film formers and the coats produced therefrom are distinguised by very low permeability to moisture vapour and gas. The use of aqueous plastics dispersions has, compared with the use of plastics solutions, the advantage that the former have, with a higher content of plastics than the latter, a sufficiently low viscosity to be applied with ease to the sheet to be coated.

It is also known to provide sheets with coats of two different plastics materials by twice applying and allowing to dry plastics solutions or plastics dispersions, in order to improve thereby several properties of the coated sheet in contrast to the uncoated sheet to a higher degree than can be achieved when the sheet is only coated once in a similar simple manner.

When water-absorbent backings, such as sheets of regenerated cellulose, are coated, the water contained in the plastics dispersion is very quickly absorbed by the backing after the said dispersion has been applied. The result of this behaviour of the water in the dispersion is that a coating of irregular thickness is obtained when a highly concentrated dispersion is applied, since after application the dispersion becomes pasty so rapidly owing to the speedy removal of water that it becomes practically impossible to ensure a uniform distribution of the emulsion on the surface of the cellulose sheet, for example by means of an air brush. Another disadvantage of the removal of water when a plastics emulsion is applied to a water-absorbent backing is that the greater part of the water of the emulsion that has been absorbed by the backing has to be expelled therefrom during the drying stage, but this is delayed because the film of plastics material forming on the coat of emulsion applied presents an obstacle to the passage of water and hence a shortening of the drying period by more intense heating is only possible within narrow limits.

The present invention is based on the observation that the disadvantages described above in the coating of regenerated cellulose in sheet form by the application and drying of an aqueous dispersion of a thermoplastic material are eliminated by forming on the sheet an intermediate layer of a hydrophobic film-forming substance having a thickness of at the most 1μ.

The invention will be further illustrated by reference to the accompanying drawing in which is shown a flow diagram of the process of the invention.

Referring to the drawing, a regenerated cellulose film 1 is coated with a subcoat 2 of a low solids content aqueous dispersion of a hydrophobic, resinous, film-forming material so that the dried subcoating has a thickness not exceeding 1 micron. The dispersion coated onto the regenerated cellulose base is dried to a compact nonhygroscopic layer 3, and then coated with an aqueous dispersion of a resinous thermoplast 4 after which the latter aqueous dispersion is dried to form the final coated film 5.

In the process only a small quantity of the substance is applied as an intermediate layer to the cellulose layer to be coated, but sufficient to be capable of producing on the surface of the sheet a very thin but continuous hydrophobic layer, which is of great importance for the result intended. The most suitable thickness of the intermediate layer depends inter alia on the water content of the original cellulose sheet and the nature of the substance forming the intermediate layer. The upper limit of 1μ is set by the fact that with thicker intermediate layers the obtainable increase in the speed of the process over known prior art is insignificant. The lower limit can easily be ascertained by experiment. If the intermediate layer is too thin it has water-permeable pores, which are considerably accentuated in the layer that is formed by the application of the plastics dispersion to the intermediate layer. Generally speaking, intermediate layers 0.1 to 0.8μ thick ensure most advantageously that the plastics dispersion to be applied to the intermediate layer is dried very rapidly and the film formed from the dispersion still has a smooth surface. The coating of regenerated cellulose in sheet form can usually be effected with the use of an intermediate layer according to the invention five to ten times more rapidly than direct coating, even if the latter is effected with the use of an emulsion of the highest concentration which still allows to obtain from the application a coating film having a smooth surface.

For the formation of the intermediate layer there may be used, for example, dilute dispersions, for instance those having a content of solid substances of 4 to 5 percent by weight. When aqueous dispersions are used to form the intermediate layer the water of the dispersion is likewise absorbed by the water-absorbent cellulose backing, but the film forming on the backing from the dispersion residue is thin enough for the water to be removed fairly rapidly from the backing during the drying process.

After the application of an aqueous plastics dispersion to a sheet of regenerated cellulose the edges of the sheet usually become warped. When sheeting is being coated continuously, this warping of the edges is very troublesome, so that it has hitherto been preferred not to coat narrow strips along the margin of the sheeting with the dispersion, in order that the edges of the sheeting may remain smooth, and to cut off the uncoated edges later. When there is used in the process of the invention for the coating for the formation of the intermediate layer a solution of a hydrophobic, film-forming substance in an organic solvent, the above-mentioned disadvantage does not occur, and the sheeting can be coated right up to its extreme edges without any particular difficulty even when the aqueous plastics dispersion is applied to the intermediate layer. Since the organic solvent of the coat for the formation of the intermediate layer does not penetrate into the cellulose sheet, it can be evaporated very rapidly, so that when an immediately succeeding coating with the dispersion to be subsequently applied is carried out, it is possible to proceed with the greatest possible speed allowed by the dispersion coating operation. The use of solutions in organic solvents in forming the intermediate layer has the advantage that a coated web of regenerated cellulose shrinks in width to a lesser extent than when an aqueous dispersion is used. The most important advantage of the use of non-aqueous solutions for the formation of the intermediate layer is, however, the fact already mentioned that in this manner it is possible without any special difficulty to coat the cellulose web over its entire breadth.

The adhesion of the intermediate layer to the sheet of regenerated cellulose to be coated is usually substantially better when the base sheet is provided with an adhesion agent. This can be incorporated, in the manner known per se at the same time as a plasticizer during treatment in the plasticizer bath. As such adhesion agents, for example, condensation products of melamine and formaldehyde are known.

If there is used to form the intermediate layer a solution of one or more of the known copolymers of 75% to 90% by weight of vinyl chloride, 10% to 25% by weight of vinyl acetate and 0.1% to 5% by weight of an $\alpha,\beta$-unsaturated acid such as maleic acid or its anhydride, fumaric acid, acrylic acid, methacrylic acid, crotonic acid, citraconic acid or a mixture of these acids, it is unnecessary to provide the cellulose sheet with an adhesion agent. This also results in important advantages, for example compared with the impregnation with adhesion agents in the plasticizer bath. Thus, the cellulose sheets impregnated with an anchoring agent, after prolonged storage of, say, several months, have a markedly reduced bonding capacity between impregnation and coating, so that this storage period of the cellulose sheets must be controlled and kept short if non-uniform bond strengths of the coats are to be avoided. Another disadvantage of impregnation with adhesion agents in the plasticizer bath is that the plasticizer and anchoring agent are not absorbed by the cellulose sheet from the impregnation bath at the same speed, so that careful supervision and continuous adjustment of the bath are needed to obtain sheets of uniform quality. Both disadvantages are avoided when the intermediate layer is made from the above-mentioned vinyl chloride copolymers.

The aqueous disperisions which are used in the process according to the invention for making the coating layer applied to the intermediate layer, may have a very high content of dispersed thermoplastic material. Although the previously formed very thin intermediate layer by no means renders the sheet completely moisture vapour proof and water resistant, it is sufficient to prevent the passage into the sheet of substantial quantities of water from the aqueous dispersion applied to the intermediate layer. By this means an excessively rapid thickening of the dispersion is prevented and a coat having a very uniform surface is formed. Even when the dispersion coat is dried in the hot only a negligible proportion of the dispersions water penetrates an intermediate layer of the specified thickness of at the most $1\mu$. This is surprising since the permeability to water would be expected to increase sharply with the temperature. The substantial prevention of the passage of water through the intermediate layer from the dispersion applied to it into the sheet makes it possible to dry the dispersion coat in a shorter time than in earlier processes, as already mentioned, and moreover with less consumption of energy.

The process of the invention can be applied, if desired, to both surfaces of a sheet or regenerated cellulose.

The thickness of the layer applied as an intermediate layer can often only be measured with great difficulty by direct methods avoiding destruction of the composite material. It may be necessary, therefore, to estimate periodically the intermediate layer applied by weighing a coated piece of sheet of measured area in the dry state, then removing the intermediate layer by means of a solvent and weighing the sheet again after drying as before. The difference in weight then corresponds to the weight of the layer removed, from which the thickness of the removed layer may be determined from the known specific gravity of the material thereof. It is often simpler, however, to determine a physical property of the sheet which alters greatly with the thickness of coating, such as its permeability to moisture vapour under defined conditions, and to deduce the thickness of the layer in question by means of empirical values from the measurement data found.

The invention will be further illustrated by reference to the following specific examples:

Example 1

To a web of regenerated cellulose hydrate, which was impregnated with glycerol and a urea-formaldehyde resin and weighed 40 grams per square metre, there was applied an aqueous dispersion, containing 4% by weight of solid substance, of a copolymer of vinylidene chloride with acrylonitrile and methyl acrylate, and the web was then dried. The coating was applied with a roller system and a so-called air brush, the process being carried out in such a manner that narrow strips remained uncoated along both edges of the web, in order to prevent the edges turning up in the drying portion of the coating apparatus. Thickness of the coating remaining behind after the water of the dispersion had dried out was shown by measurement of the permeability to moisture vapour to be $0.2\mu$, that is to say a layer of about 0.35 gram per square metre.

The coated surface of the web was then coated by means of an air brush with an aqueous dispersion having a solid content of 45% by weight and the same chemical composition as the dispersion first applied. Care was also taken in this case to leave narrow strips uncoated along the edges of the sheeting. The second layer was $3\mu$ thick after the water of the dispersion has dried out, that is to say about 5 grams per square metre. The web had shrunk during the coating process by about 6% of its breadth.

The permeability of the sheet to moisture vapour at 20° C. and 85% relative atmospheric humidity was 60 grams of water per square metre per 24 hours after the application of the first layer, and 6.5 grams of water per square metre per 24 hours after the application of the second layer. The speed of travel in both cases was 20 metres per minute.

When an attempt was made to apply a dispersion containing 45% by weight of solid substance to the cellulose sheet without first applying a thin intermediate layer, the coat could only be levelled with the air brush to an inadequate extent because the dispersion applied thickened too rapidly, and the drying could not be effected at a rate more rapid than 3 metres per minute with a drying distance of the same length.

Example 2

With the same coating equipment as that used in Example 1, a web of regenerated cellulose hydrate weighing 40 grams per square metre and impregnated with glycerol and a urea-formaldehyde resin was coated with a solution of 2% by weight of a vinylidene chloride copolymer in ethyl acetate up to the extreme edges of the web. The solution was then dried. The thickness of the coat remaining was ascertained, by determining the permeability to water vapour, to be $0.1\mu$. To the surface of the sheeting thus coated there was applied by means of a roller and an air brush an aqueous dispersion of another vinylidene chloride copolymer having a content of solid substance of 40% by weight and insoluble in ethyl acetate, this being likewise applied right to the edges of the web. After the water has dried out the thickness of the remaining coat was $3\mu$ or 5 grams per square metre.

In both coating operations a speed of working of 20 metres per minute could be maintained without difficulty.

After drying, the supporting web had only shrunk by 2 to 3% of its breadth. The permeability to moisture vapour of the twice coated sheeting was 3.2 grams of water per square metre per 24 hours at 20° C. and 85% relative atmospheric humidity.

Example 3

A web of regenerated cellulose hydrate of 40 grams per square metre, containing glycerol but no anchoring agent, was coated with an ethyl acetate solution of 10 percent strength of a copolymer of 87 to 88% by weight of vinyl chloride, 11 to 12 percent by weight of vinyl acetate and 1.0 to 1.1 percent by weight of maleic anhydride, in such a manner that after the solvent had dried out a layer 0.5μ thick remained behind on the cellulose hydrate film.

A coating of a copolymer of vinylidene chloride with acrylonitrile and methyl acrylate was applied to this from an aqueous dispersion so that a layer about 4μ thick remained behind after the drying out.

The film formation, in the cases of both the first and the second layer, was effected very rapidly, so that the speed of running was about 100 metres per minute. After the water had dried out of the dispersion applied, in a drying channel heated to a temperature of about 100 to 110° C., a firm bonding of the first layer to the second was obtained.

When an intermediate layer was not used, the speed of running obtainable under otherwise identical conditions for sufficient drying was only 35 metres per minute. In addition, the sheet could not then be coated up to the edge and the adhesion of the layer applied from the dispersion to the cellulose hydrate sheet was very low.

Example 4

A sheet of regenerated cellulose hydrate weighing 40 grams per square metre and containing glycerol but no anchoring agent was coated thinly up to its extreme edges with a solution of 5% by weight strength of plastics in ethyl acetate. The solution contained 2% by weight of a vinylidene chloride-acrylonitrile copolymer with a preponderant proportion of vinylidene chloride and 3% by weight of the vinyl chloride-vinyl acetate-maleic anhydride copolymer described in Example 3. After the solution applied had dried, a plastics layer of about 0.5 to 0.7μ was provided on the sheet.

To the coated cellulose sheet there was applied an aqueous dispersion of 40% strength of a copolymer of vinylidene chloride with acrylonitrile and methyl acrylate, followed by drying.

The bond strength between the sheeting and the intermediate layer was greater in the sheet thus obtained than in the sheet obtained as described in Example 3. The improvement of this bond strength results in greater strength of welds formed when this sheet is welded.

It will be obvious to those skilled in the art that many modifications may be made within the scope of the present invention without departing from the spirit thereof, and the invention includes all such modifications.

What is claimed is:

1. A process for making coated regenerated cellulose sheet which comprises applying to the sheet an aqueous dispersion, of low solids content, of a hydrophobic resinous, film-forming material, drying the applied dispersion to form a first layer having a thickness not exceeding 1μ, applying to the first layer an aqueous dispersion, of high solids content, of a resinous thermoplastic material, and drying to form a second layer.

2. A process according to claim 1 in which the hydrophobic, resinous, film-forming material comprises a terpolymer of vinylidene chloride, acrylonitrile, and methyl acrylate.

3. A process according to claim 1 in which the resinous thermoplastic material employed to form the second layer comprises a terpolymer of vinylidene chloride, acrylonitrile, and methyl acrylate.

4. A coated regenerated cellulose sheet having a first layer applied thereon from an aqueous dispersion, the layer having a thickness not exceeding 1μ and consisting essentially of a conjoint polymer of 75 to 90 percent by weight of vinyl chloride, 10 to 25 percent by weight of vinyl acetate, and 0.1 to 5 percent by weight of an α,β-unsaturated acid, and a second layer of a resinous thermoplastic material.

5. A coated regenerated cellulose sheet according to claim 4 in which the unsaturated acid is maleic acid.

6. A process according to claim 1 in which the dispersion of low solids content contains up to 5 percent by weight of solids and the dispersion of high solids content contains at least 40 percent by weight of solids.

References Cited by the Examiner

UNITED STATES PATENTS

| | | | |
|---|---|---|---|
| 2,329,456 | 9/1943 | Campbell | 260—78.5 |
| 2,391,621 | 12/1945 | Powell et al. | 117—45 |
| 2,570,478 | 10/1951 | Pitzl | 117—76 |
| 2,639,241 | 5/1953 | Cornwell | 117—76 |
| 2,684,919 | 7/1954 | Berry et al. | 117—145 XR |
| 2,748,027 | 5/1956 | Meier | 117—161 |
| 2,819,985 | 1/1958 | Cobbs | 117—76 |
| 2,824,025 | 2/1958 | McIntyre | 117—138.8 |
| 2,951,769 | 9/1960 | McKnight | 117—72 |
| 3,018,197 | 1/1962 | Covington et al. | 117—161 |
| 3,053,661 | 9/1962 | Starck et al. | 117—161 |
| 3,057,752 | 10/1962 | Covington | 117—145 XR |
| 3,057,756 | 10/1962 | Cornwell | 117—161 |
| 3,085,901 | 4/1963 | Lindsey et al. | 117—76 |

WILLIAM D. MARTIN, *Primary Examiner.*

RICHARD D. NEVIUS, *Examiner.*